March 27, 1962 E. LYNCH 3,026,866
COLLAPSIBLE REFLECTOR OVEN
Filed April 24, 1961 2 Sheets-Sheet 1
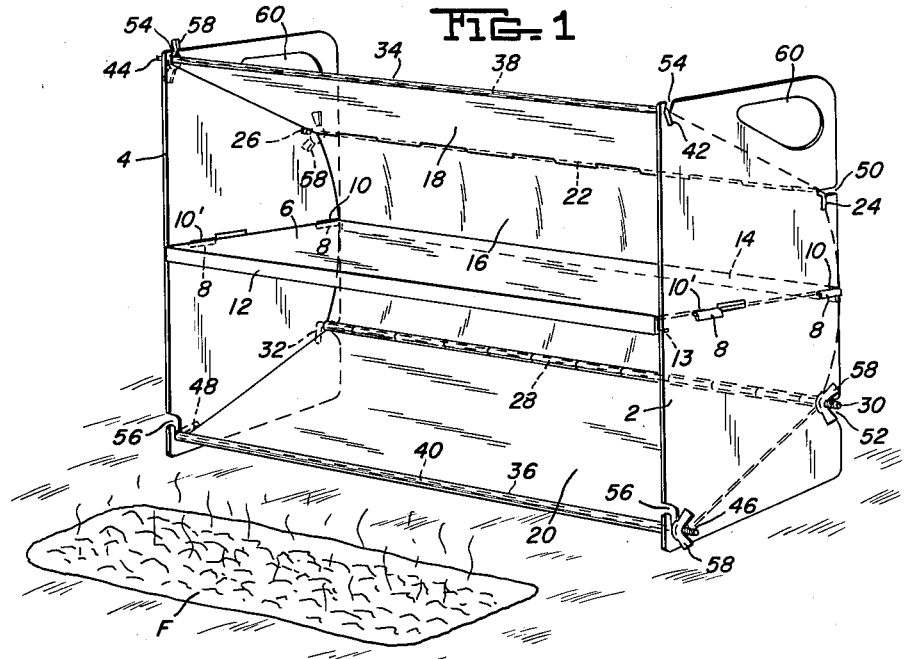
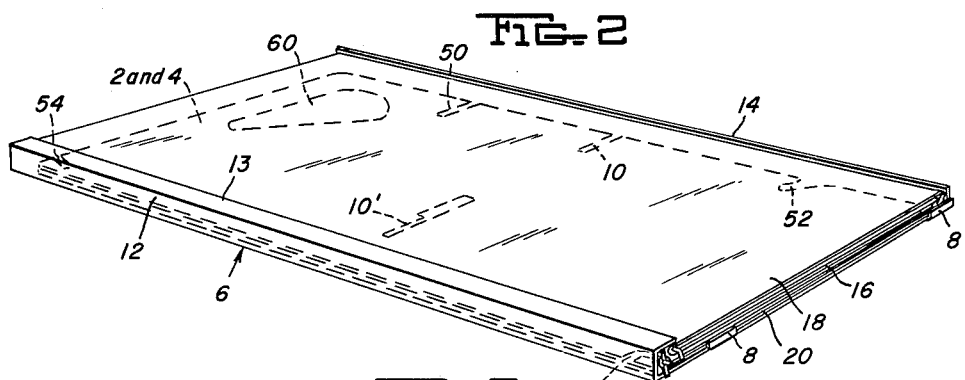
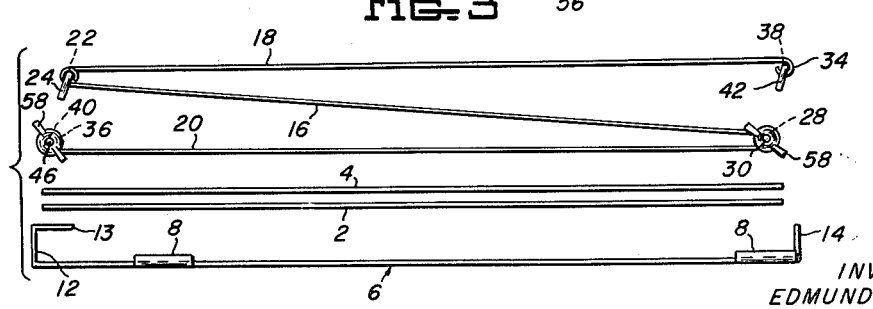
INVENTOR
EDMUND LYNCH
By Donald S. Ferito
Attorney

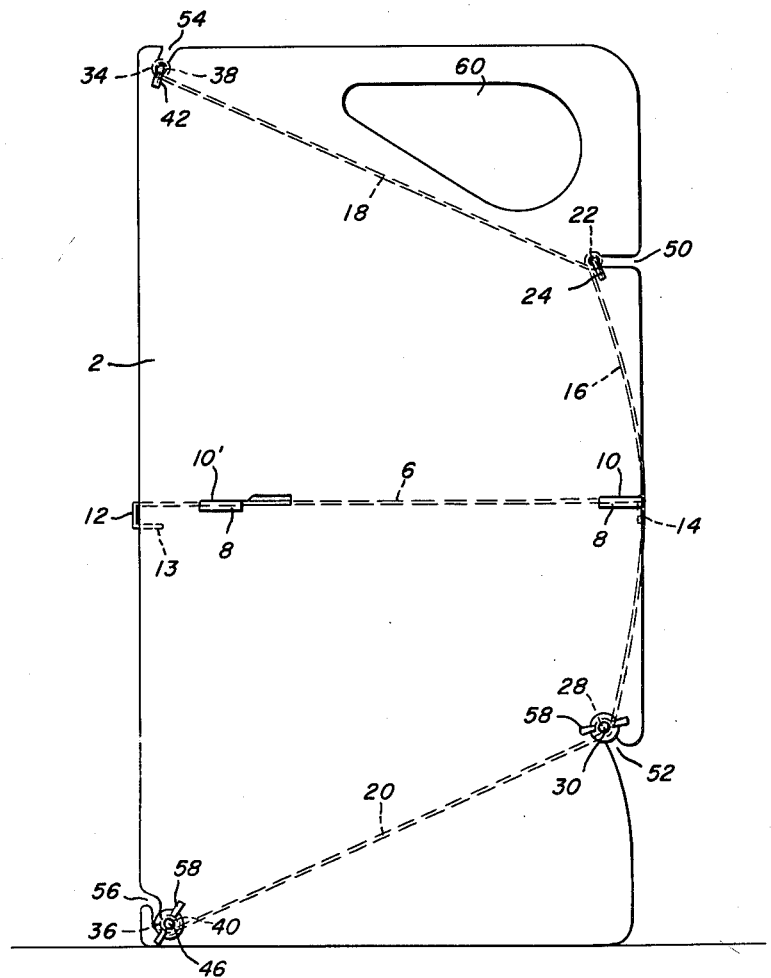

United States Patent Office 3,026,866
Patented Mar. 27, 1962

3,026,866
COLLAPSIBLE REFLECTOR OVEN
Edmund Lynch, Crafton, Pa.
(22 N. Grandview Ave., Pittsburgh 5, Pa.)
Filed Apr. 24, 1961, Ser. No. 104,941
8 Claims. (Cl. 126—274)

The present invention relates generally to reflector ovens, and more particularly to an improved collapsible reflector oven especially suitable for use with outdoor open fires.

As is well known, reflector ovens are used by sportsmen, campers, hikers, etc. for cooking in the out-of-doors at an open fire. Inasmuch as the principal users of reflector ovens frequently carry or portage their equipment, it is desirable that the reflector oven be capable of being collapsed into a compact, light-weight package and be easy to assemble into a sturdy unit having efficient cooking qualities. The reflector oven of my invention described hereinafter is possessed of all of these features.

Prior to my invention, collapsible reflector ovens were constructed generally in a shape having a triangular cross-section. One example of this type of reflector oven is shown by Smith Patent No. 2,921,577. In use, this type of reflector oven was setup adjacent an open fire with its wide opening or bottom of the triangle facing the fire and its closed end or vertex of the triangle disposed remote from the fire. The cooking shelf of the oven was disposed in a horizontal plane extending from the opening of the oven to the inner end thereof bisecting the triangular shaped cross-section.

Although various collapsible structural arrangements are shown by reflector ovens of the prior art, all had a substantially triangular cross-section when assembled for use. This triangular construction rendered the reflector ovens inefficient and difficult to use. For example, the triangular cross-sectional shape diminished the head room between the upper reflecting surface and the cooking shelf to such an extent that only a small portion of the cooking shelf could be utilized efficiently. The triangular design also created an area of reduced heat at the rear of the oven in the vicinity of the vertex of the triangle. Since the vertex of the triangular cross-sectional shape of the oven was remote from the source of heat when used with an open fire, this portion of the oven was cooled by the mass of cooler air surrounding the vertex and, as a result, food on the cooking shelf did not cook as well adjacent the vertex as it did adjacent the open end of the oven. This necessitated constantly turning or changing the position of the food being cooked to enable it to cook uniformly.

It is, accordingly, a primary object of my invention to provide an improved collapsible reflector oven having a concave reflector surface behind the cooking shelf of the oven extending above and below the cooking shelf, and upper and lower reflector surface members extending angularly from the concave reflector surface member in planes above and below the cooking shelf, respectively, whereby heat is reflected uniformly onto the cooking shelf.

It is another object of my invention to provide an improved collapsible reflector oven as set forth by the object above wherein the upper reflector surface member extends from the upper edge of the concave reflector surface member at a diverging angle relative to the horizontal plane containing the cooking shelf so that an optimum amount of headroom is provided above the entire area of the cooking shelf.

It is another object of my invention to provide an improved collapsible reflector oven as set forth by the above objects wherein the reflector surface members are provided with means whereby they can be detachably attached to the side members of the oven and which means will also serve to pivotally connect the upper and lower reflector surface members to the concave reflector surface member so that the reflector surface members can be folded into a flat compact unit when detached from the side members.

It is still another object of my invention to provide an improved collapsible reflector oven as set forth by the above objects wherein the cooking shelf is formed with opposed flanged retaining sides for compactly containing the side members and folded reflector surface members when the oven is collapsed.

It is a further object of my invention to provide an improved collapsible reflector oven as set forth by the above objects which is composed of structural elements which can be easily and inexpensively stamped from sheet metal.

These and other objects will become more apparent after referring to the following specification and attached drawings, in which:

FIGURE 1 is a perspective view of the reflector oven of the invention assembled for use at an open fire;

FIGURE 2 is a perspective view of the reflector oven of the invention in collapsed form;

FIGURE 3 is an exploded view of the elements of the reflector oven of the invention in collapsed form prior to formation of the package shown in FIGURE 2; and FIGURE 4 is an enlarged side elevational view.

Referring more particularly to the drawings reference characters 2 and 4 designate flat, substantially rectangular sheets which form the opposed, upright side members of the reflector oven of the invention. A cooking shelf 6 is detachably attached to and extends between the side members 2 and 4 intermediate the ends thereof. As best shown in FIGURE 1, the side members 2 and 4 together with the cooking shelf 6 form a substantially H-shape structure.

The cooking shelf 6 is detachably connected to the side members by means of spaced, bent tabs 8 which project from the ends of the cooking shelf and fit removably in elongated slots 10 and 10' provided in the side members 2 and 4. The slots 10 are disposed in the rearward edges of the side members, have an open end, and extend inwardly from the rearward edges of the side members. Slots 10' are disposed toward the front edges of the side members, have closed ends, and are each provided with a portion of enlarged cross-sectional area for initially receiving the bent tabs 8 and a portion of reduced cross-sectional area for retaining the tabs 8. In attaching the cooking shelf to each of the side members in turn, the tab 8 toward the front of the shelf is inserted in the enlarged portion of slot 10' and tab toward the rearward end of the shelf is placed adjacent the open end of the slot 10. The shelf is then moved toward the forward edge of the side member to insert the rearward tab 8 in the slot 10 and the forward tab 8 in the reduced portion of slot 10', respectively. The cooking shelf is formed with longitudinal flanges 12 and 14 extending along the front and rear edges, respectively, thereof. Both flanges extend at substantially right angles to the planar surface of the shelf. Front flange 12 is formed with an inwardly directed lip 13 which extends parallel with the surface of the shelf and forms a channel which cooperates with the flange 14 to encase the other elements of the oven when the oven is collapsed as will be more fully explained hereinafter.

A concave or bowed reflector surface member 16 is disposed adjacent the rear edge of the cooking shelf and extends above and below the shelf. Flat upper and lower reflector surface members 18 and 20 extend angularly from the top and bottom edges, respectively, of the concave reflector surface member 16 toward the forward edges of the side members 2 and 4. The adjacent edges of the upper reflector surface member 18 and the upper portion of the concave reflector surface member 16 are hinged together by means of a hinge pin 22, the ends 24 and 26 of which project outwardly of the reflector surface members. The adjacent edges of the lower reflector surface member 20 and the lower portion of the concave reflector surface member 16 are hinged together by means of a hinge pin 28 having projecting ends 30 and 32. The hinged edges of the reflector surface members are notched and bent around the respective hinge pins to form a hinged unit which will lay flat when folded, as best shown in FIGURE 3.

The forward edges of the upper and lower reflector surface members 18 and 20 are rolled to form tubes 34 and 36, respectively, for containing stiffener rods 38 and 40, respectively. Rod 38 has projecting ends 42 and 44, and rod 40 has projecting ends 46 and 48 for a purpose which will become apparent.

As best shown in FIGURE 4, the upper and lower reflector surface members 18 and 20 extend away from the concave reflector at a diverging angle relative to the horizontal plane containing the cooking shelf. This arrangement provides a maximum amount of headroom above the cooking and also insures efficient, uniform reflection of heat from the open fire.

Each of the side members 2 and 4 is provided with a pair of vertically spaced, inwardly directed notches 50 and 52 in the rearward edges thereof. A notch 54 is formed in the upper edge of each of the side members adjacent the forward edge thereof. Another notch 56 is formed in the lower portion of the forward edge of each of the side members 2 and 4. The reflector surface members are detachably attached to the side members 2 and 4 by means of the projecting ends 46 and 48 of the stiffener rod 40 fitting in the notches 56; the projecting ends 30 and 32 of hinge pin 28 fitting in notches 52; the projecting ends 24 and 26 of hinge pin 22 fitting in notches 50; and the projecting ends 42 and 44 of stiffener rod 38 fitting in the notches 54. One end of each of the hinge pins and the stiffener rods is bent at right angles while the opposite end thereof is threaded to accommodate a wing nut 58. The bent ends serve as fixed heads or stops and the wing nuts 58 serve to detachably secure the hinge pins and stiffener rods within their respective notches. It will be noted that, if desired, each of the pins and rods can be straight and threaded at both ends so that wing nuts can be used at both ends thereof for securing to the side members. Although I have shown the use of wing nuts for securing the hinge pins and stiffener rods in position, it will be understood that other forms of nuts or similar securing means can be used for this purpose.

The bottoms of the side members 2 and 4 are co-planar and function as supporting legs for maintaining the reflector oven of the invention in standing position when in use so that no supplementary means are required to keep the oven in upright position. As desired, the bottom edges of the side members can be cut out to form spaced legs or left solid as shown.

An opening 60 is provided in the upper portion of each of the side members 2 and 4 whereby the assembled reflector oven of the invention can be manually gripped and positioned for moving the oven relative to a fire F. The openings 60 are above the upper reflector surface members 16 and 18 so that the hands of the cook will be protected from the direct heat of the fire when the oven is handled.

In assembling the reflector oven of the invention, it is preferable to first attach the cooking shelf 6 to the side members 2 and 4 by inserting the tabs 8 of the cooking shelf into the slots 10 and 10' of each of the side members in turn as described hereinbefore. The cooking shelf is preferably positioned with the flanges 12 and 14 projecting downwardly so that an unobstructed cooking surface will be provided. Then the hinged unit comprising the reflector surface members 16, 18 and 20 is applied to the side members by successively inserting the projecting ends of the stiffener rod 40 in the notches 56, the projecting ends of hinge pin 28 in notches 52, the projecting ends of hinge pin 22 in notches 50, and finally the projecting ends of stiffener rod 38 in the notches 54. After each stiffener rod or hinge pin is inserted into its respective pair of notches the wing nut 58 on the end of the rod or pin is tightened slightly to retain the rod or pin in position but not so tightly as to prevent the other reflector surface members from swinging into position for insertion of succeeding hinge pins and stiffener rods in the proper notches. After all of the stiffener rods and hinge pins have been thus properly inserted in their proper notches all of the wing nuts 58 are tightened sufficiently to hold the entire unit securely together. It will be noted that as the reflector surface members are attached the intermediate reflector surface member 16 which, when detached from the side members is flat, as shown in FIGURE 3, becomes bowed or concave and presses against the back of the cooking shelf 6 holding the shelf securely in place. This is effected by forming notches 50 and 52 with their innner ends disposed inwardly and spaced from the rear edge of the shelf 6, as is best shown in FIGURES 1 and 4.

In collapsing the reflector oven of the invention the elements thereof are disconnected in reverse order to that followed in assembly. When disconnected, the shelf 6 is placed on the ground or other convenient surface with its flanged edges up. The two side members are then placed one on top of the other on the upturned surface of shelf 6 between the flanges 12 and 14 and with one edge thereof under the lip 13. Then the hinged reflector surface members are folded together to form a flat compact unit which is placed on top of the previously positioned side members between the flanges 12 and 14 and with one side disposed under the lip 13. The flanges 12 and 14 are dimensioned relative to each other so that the side members and folded reflector surface members can be easily and quickly nested on the shelf 6 and be retained thereon by the lip 13 as best shown in FIGURES 2 and 3. The wing nuts 58 and the bent ends of the stiffener rods and hinge pins co-operate with the end edges of the cooking shelf 6 to prevent endwise sliding movement of the nested parts. The bent tabs 8 on the ends of the cooking shelf also aid in preventing endwise movement of the parts nested in the shelf.

While one embodiment of my invention has been shown and described, it will be apparent that other adaptations and modifications may be made without departing from the scope of the following claims.

I claim:

1. A collapsible reflector oven comprising a pair of spaced upstanding side members, each of said side members being substantially rectangular in shape and having forward, rearward, top and bottom edges, a cooking shelf extending in a horizontal plane between said side members, means detachably connecting said shelf with said side members intermediate the top and bottom edges thereof, a rearwardly bowed concave reflector member extending between said side members, means detachably connecting said concave reflector member to said side members, said concave reflector member having an intermediate portion abutting the longitudinal edge of said cooking shelf extending between the rearward edges of said side members and having an upper portion extending above said cooking shelf and a lower portion extending below said cooking shelf, substantially flat upper and lower reflector members pivotally connected with and extending angularly from the upper and lower edges, respectively, of said concave reflector member, said upper and lower reflector members extending between said side members and spaced inwardly from the top and bottom edges thereof, respectively, and means detachably connecting said upper and lower reflector members to said side members, each of said upper and lower reflector members extending away from said concave reflector member at a diverging angle relative to the horizontal plane containing said cooking shelf.

2. A collapsible reflector oven as defined by claim 1 wherein said means detachably connecting said cooking shelf includes at least two spaced tabs projecting from each end of said shelf, and slots in said side members for removably receiving said tabs.

3. A collapsible reflector oven as defined by claim 1 in which the front and rear edges of said cooking shelf are turned at substantially right angles to the horizontal plane containing said shelf, and one of said turned edges has an inwardly directed lip thereon extending parallel with said shelf.

4. A collapsible oven as defined by claim 1 characterized by a pivot pin disposed between the adjacent edges of said concave reflector member and each of said upper and lower reflector members, respectively, said reflector members being pivotally mounted on said pivot pins, said means for detachably connecting said upper and lower reflector members to said side members including end portions on said pivot pins projecting beyond the side of said reflector members, spaced notches in the rearward edge of each of said side members for removably receiving the projecting ends of said pivot pins, and means on the projecting ends of each of said pivot pins for detachably retaining said pivot pins in said notches.

5. A collapsible reflector oven as defined by claim 1 in which the free edge of each of said upper and lower reflector members is rolled to form a longitudinally extending tube, said means for detachably connecting said upper and lower reflector members to said side members including a rod disposed in each of said tubes with the ends thereof projecting beyond the respective reflector member, a pair of spaced notches in each of said side members for removably receiving the projecting ends of said rods, said pairs of notches being remote from the rearward edges of said side members, and means on the projecting ends of said rods for detachably retaining said rods in said pairs of notches.

6. A collapsible reflector oven as defined by claim 5 in which one notch of said pair of notches in each of said side members is disposed in the top edge of the side member adjacent its forward edge, and the other notch of said pair of notches in each of said side members is disposed in the forward edge of the side member adjacent the bottom edge thereof.

7. A collapsible reflector oven as defined by claim 1 in which the bottom edges of said side members are substantially flat and co-planar whereby said reflector oven is rendered self-supporting.

8. A collapsible reflector oven as defined by claim 1 in which each of said side members has an opening therethrough subjacent its top edge and above said upper reflector member whereby said reflector oven can be grasped for handling.

References Cited in the file of this patent
UNITED STATES PATENTS

| | | |
|---|---|---|
| 548,499 | Ashmore | Oct. 22, 1895 |
| 2,520,030 | Cliff | Aug. 22, 1950 |
| 2,551,026 | Loeher | May 1, 1951 |
| 2,757,664 | McDowell | Aug. 7, 1956 |
| 2,830,729 | Brackett | Apr. 15, 1958 |
| 2,921,577 | Smith | Jan. 19, 1960 |